(12) United States Patent
Blaser

(10) Patent No.: US 12,209,659 B2
(45) Date of Patent: Jan. 28, 2025

(54) METHOD AND CONTROL APPARATUS FOR OPERATING A MOTOR VEHICLE

(71) Applicant: ZF Friedrichshafen AG, Friedrichshafen (DE)

(72) Inventor: Jürgen Blaser, Meckenbeuren (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 170 days.

(21) Appl. No.: 17/932,892

(22) Filed: Sep. 16, 2022

(65) Prior Publication Data
US 2023/0175583 A1 Jun. 8, 2023

(30) Foreign Application Priority Data
Dec. 6, 2021 (DE) ...................... 10 2021 213 829.2

(51) Int. Cl.
*F16H 63/48* (2006.01)
*F16H 61/02* (2006.01)
*F16H 61/70* (2006.01)

(52) U.S. Cl.
CPC ....... *F16H 61/702* (2013.01); *F16H 61/0213* (2013.01); *F16H 63/483* (2013.01)

(58) Field of Classification Search
CPC .. F16H 61/702; F16H 61/0213; F16H 63/483; F16H 61/0403; F16H 61/0437; F16H 63/48
See application file for complete search history.

(56) References Cited

U.S. PATENT DOCUMENTS 5,827,149 A * 10/1998 Sponable ............ F16H 63/3491
477/92

FOREIGN PATENT DOCUMENTS

| AT | 514542 A1 | * | 1/2015 | ............. F16H 3/006 |
|---|---|---|---|---|
| DE | 10 2011 076 964 A1 | | 12/2012 | |
| DE | 10 2016 207 818 A1 | | 11/2017 | |
| JP | 2011122670 A | * | 6/2011 | |
| JP | 2021081050 A | * | 5/2021 | |
| WO | 2011/062544 A1 | | 5/2011 | |

OTHER PUBLICATIONS

German Patent Office, Office Action issued in German patent application No. 10 2021 213 829.2 (Jun. 29, 2022).

* cited by examiner

*Primary Examiner* — Justin Holmes
(74) *Attorney, Agent, or Firm* — Finch & Maloney PLLC

(57) ABSTRACT

A motor vehicle transmission is connected between a drive aggregate and a drive output, and includes a powershiftable main transmission group with a plurality of forward gears and at least one reversing gear. A hydrodynamic starting element is connected between the drive aggregate and the transmission. The main transmission has frictional shifting elements of which, in each gear, a first number are closed and a second number are open. The main transmission has a parking lock that, when engaged, immobilizes an output shaft of the main transmission group.

A downstream range group includes at least one interlocking shifting element and can be shifted between a first range and a second range. When the motor vehicle is stationary with the drive aggregate running, to shift the downstream range group the parking lock is first engaged, and then the downstream range group is shifted into neutral from a range to be disengaged.

9 Claims, 2 Drawing Sheets

METHOD AND CONTROL APPARATUS FOR OPERATING A MOTOR VEHICLE

RELATED APPLICATIONS

This application claims the benefit of and right of priority under 35 U.S.C. § 119 to German Patent Application no. 10 2021 213 829.2. filed on 6 Dec. 2021, the contents of which are incorporated herein by reference in its entirety.

FIELD OF THE DISCLOSURE

The invention relates to a method and a control unit for operating a motor vehicle.

BACKGROUND

A drive-train of a motor vehicle comprises a drive aggregate and a transmission connected between the drive aggregate and a drive output. The transmission converts rotation speeds and torques, and thus transmits a traction force provided by the drive aggregate to the drive output. A hydrodynamic starting element with a converter and a converter bridging clutch can be connected between the drive aggregate and the transmission.

From practice it is already known that the transmission can be in the form of a group transmission. A group transmission comprises a main transmission group, also called the main group. The main transmission group serves to provide a plurality of frictional forward gears and at least one frictional reversing gear. The main transmission group can be powershiftable and in that case comprises a plurality of frictional shifting elements. Typically, connected downstream from the main transmission or main group there is a downstream range group, which is connected between an output shaft of the main transmission group and the drive output. Such a downstream range group is a group of the group transmission which can serve to provide a slow-drive range and a fast-drive range. A downstream range group can also serve to provide an all-wheel driving range and a non-all-wheel driving range. Typically, the downstream range group cannot be powershifted and then comprises at least one interlock-type shifting element. Sometimes an upstream splitter group can be connected upstream from the main transmission, which group is then connected between the hydrodynamic starting element and the main transmission group.

If while the motor vehicle is stationary the downstream range group has to be shifted, i.e. changed from a first range into a second range, then according to current practice the procedure is first to shift the main transmission group into neutral and also to shift the downstream range group into neutral from the range to be disengaged.

During this, as a result of drag losses in the powershiftable main transmission group its output shaft can be accelerated, and this to a rotation speed which then no longer allows the downstream range group to be shifted from neutral into the range to be engaged. The driver would then have to switch off the drive aggregate in order to shift the downstream range group into the range to be engaged. If the downstream range group is a hydraulically shifted one, then when the drive aggregate is switched off there is no longer sufficient hydraulic pressure to shift it.

There is therefore a need for a method and a control unit for operating a motor vehicle with the help of which, when the motor vehicle is stationary and the downstream range group should be shifted, it can be shifted reliably.

DE 10 2011 076 964 A1 discloses a method for operating a motor vehicle with a drive aggregate and a transmission connected between the drive aggregate and a drive output. In this case the transmission is in the form of a group transmission with a powershiftable main transmission group and a claw-shifted downstream range group. A hydrodynamic starter element is connected between the main transmission group and the drive aggregate. DE 10 2011 076 964 A1 relates to a method for shifting the downstream range group while the motor vehicle is driving, and this in connection with carrying out a gearshift in the powershiftable main transmission group.

SUMMARY

Starting from there, the purpose of the present invention is to provide a new type of method and a control unit for operating a motor vehicle.

This objective is achieved by a method for operating a motor vehicle in accordance with claim 1. When the motor vehicle is stationary with the drive aggregate running, to shift the downstream range group a parking lock of the main transmission group is first engaged in order to immobilize the output shaft of the main transmission. After that, the downstream range group is shifted into neutral from a range to be disengaged.

The invention makes possible an advantageous shifting of the downstream range group of a transmission with a powershiftable main transmission group. According to the invention, to shift the downstream range group the parking lock of the main transmission group is engaged first. In that way the output shaft of the main transmission is immobilized. This ensures that when the downstream range group is also shifted into neutral, the rotation speed of the output shaft of the main transmission group cannot increase. Regardless of how long the downstream range group is in neutral, thereafter the downstream range group can be safely and reliably be shifted into a range to be engaged.

In a first variant of the invention, when a gear is engaged in the main transmission group, before the parking lock is engaged, the main transmission group is shifted to neutral. Then, when the downstream range group is shifted to neutral, the parking lock is disengaged in order to shift the downstream range group from neutral into a range that is to be engaged, and the downstream range group is actuated in order to engage the said range.

According to a second variant of the invention, when a gear is engaged in the main transmission group, before and during the engagement of the parking lock, the main transmission group remains in the said gear. Then, when the downstream range group has been shifted to neutral, in order to shift the downstream range group from neutral into a range that is to be engaged, the main transmission group is first shifted to neutral, the parking lock is then disengaged, and the downstream range group is actuated in order to engage the said range to be engaged.

In a third variant of the invention, when a gear is engaged in the main transmission group, before and during the engagement of the parking lock, the main transmission group remains in the said gear. Then, when the downstream range group has been shifted to neutral, in order to shift the downstream range group from neutral into a range that is to be engaged, the downstream range group is actuated in order to engage the range to be engaged while the gear in the main transmission and the parking lock remain engaged, and during this it is checked whether at the interlocking shifting element of the downstream range group a tooth-on-tooth position has formed. If it is found that at the interlocking shifting element of the downstream range group a tooth-on-tooth position has formed, then the main transmission group is first shifted to neutral and the parking lock is then disengaged.

All of the above variants make it possible to shift the downstream range group reliably in a transmission with a powershiftable main transmission group. In each case the rotation speed of the output shaft of the main transmission group can be prevented from increasing too much so that as a result of too high a rotation speed of the output shaft of the main transmission group, the downstream range group can no longer be shifted from neutral into the range to be engaged.

If a tooth-on-tooth position occurs at the interlocking shifting element of the downstream range group, this can be safely resolved by the rotating output shaft of the main transmission group after the parking lock has been disengaged.

The control unit according to the invention is also disclosed.

BRIEF DESCRIPTION OF THE DRAWINGS

Preferred further developments emerge from the subordinate claims and the description given below. Example embodiments of the invention, to which it is not limited, are explained in greater detail with reference to the drawings, which show:

DETAILED DESCRIPTION

Figures 1, 2:
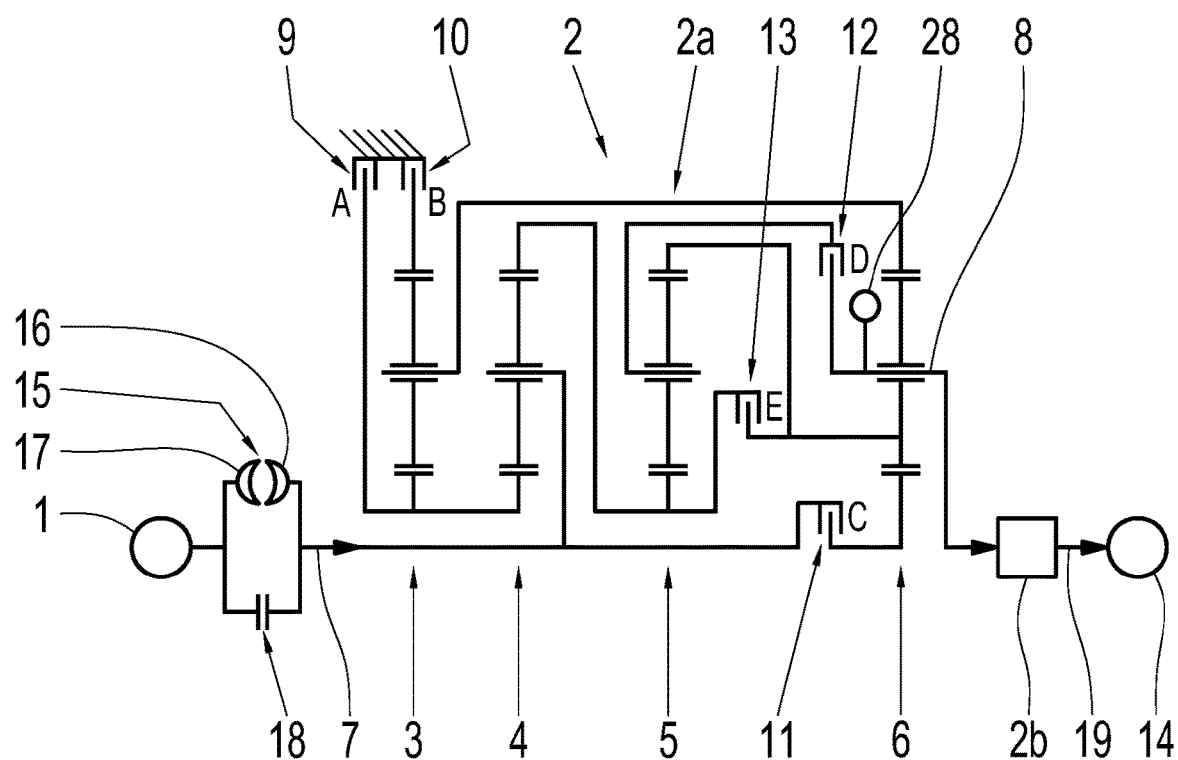
FIG. 1: An example of a drive-train diagram of a motor vehicle with an example of a transmission comprising a main transmission group and a downstream range group.
FIG. 2: A shifting matrix of the main transmission group in FIG. 1.

FIG. 1 shows schematically an example of a drive-train diagram of a motor vehicle. The drive-train in FIG. 1 comprises a transmission 2 and a drive output 14, wherein the transmission 2 is connected between the drive aggregate 1 and the drive output 14.

The transmission 2 comprises a main transmission group 2a which provides a plurality of forward gears and at least one reversing gear, and a downstream range group 2b connected on its drive input side downstream from the main transmission group 2a, which provides a first driving range and a second driving range. The first driving range can be a slow-drive range and the second driving range a fast-drive range. The first driving range can also be an all-wheel driving range and the second driving range can be a non-all-wheel driving range.

Between the drive aggregate 1 and the transmission 2, namely in the example embodiment shown between the drive aggregate 1 and the main transmission group 2a, is connected a hydrodynamic starting element with a converter 15 and a converter bridging clutch 18. A converter 15 comprises a turbine 16, and in the example embodiment shown, the turbine 16 is coupled in a rotationally fixed manner to an input shaft 7 of the main transmission group 2a. In addition, a converter 15 has a pump 17. The pump 17 is coupled rotationally fixed to the drive aggregate 1. The structure of such a converter 15 is familiar to a person with knowledge of the field.

The downstream range group 2b of the transmission 2 is connected between the main transmission group 2a of the transmission 2 and the drive output 14, and the downstream range group 2b is coupled to an output shaft 8 of the main transmission group 2a. Sometimes an upstream splitter group can be connected upstream from the main transmission group 2a, this then being located between the hydrodynamic starting element and the main transmission group 2a.

In the example embodiment shown, the main transmission group 2a of the transmission 2 comprises a plurality of gearsets 3, 4 5, and 6 and a plurality of frictional shifting elements 9, 10, 11, 12, and 13 that co-operate with the said gearsets, the two shifting elements 9 and 10 also being denoted shifting elements A and B. and the shifting elements 11, 12, and 13 also being denoted shifting elements C, D, and E. The shifting elements A and B and the shifting elements C, D, and E are in each case frictional shifting elements, namely the shifting elements A and B being brakes and the shifting elements C, D, and E being clutches.

FIG. 2 shows a shifting matrix of the main transmission group 2a of the transmission 2 in FIG. 1. It can be seen from FIG. 2 that in the case of the main transmission group 2a of the transmission 2 in FIG. 1, a total of eight frictional and thus traction-force-transmitting forward gears D1 to D8, and one frictional and thus traction-force-transmitting reversing gear R, can be provided. In each of these traction-force-transmitting gears D1 to D8 and R, a defined first number of shifting elements, namely three shifting elements of the main transmission group 2a, are closed, while in contrast a defined number of shifting elements, namely two shifting elements of the main transmission group 2a are open in each traction-force-transmitting and thus frictional gear.

The shifting elements of the main transmission group 2a, which are closed in the respective frictional and hence traction-force-transmitting gears, are indicated in FIG. 2 by a dot. For example, in forward gear D1 of the main transmission group 2a the shifting elements A, B. and C, and in forward gear D2 of the main transmission group 2a, the shifting elements A, B. and E are closed. In the reversing gear R of the main transmission group 2a, the shifting elements A, B, and D are closed. The shifting elements closed in forward gears D3, D4, D5, D6, D7, and D8 of the main transmission group 2a can also be seen from the shifting matrix in FIG. 2.

The main transmission group 2a also has a parking lock 28, such that when the parking lock 28 is engaged the output shaft 8 of the main transmission 2a is immobilized.

As already mentioned, the downstream range group 2b is connected between the output shaft 8 of the main transmission group 2a and the drive output 14. In this case the said downstream range group 2b can be designed as shown as an example in FIG. 3, wherein in FIG. 3 the downstream range group 2b comprises a planetary gear system 20 and a shifting element 24. The output shaft 8 of the main transmission group 2a is coupled to a sun gear 21 of the planetary gear system 20. The drive output 14 is coupled by way of an output shaft 19 of the downstream range group 2b to a web 23 of the planetary gear system 20. Depending on the shift position of the shifting element 24, a ring gear 22 of the planetary gear system 20 is either fixed to the housing in the slow-drive range L or is coupled to the web 23 in the fast-drive range S.

Figure 3:
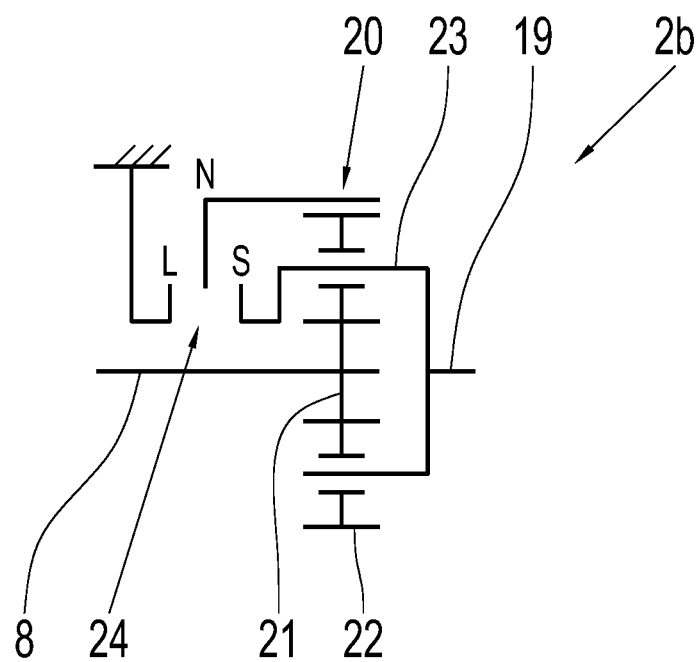
FIG. 3: A possible design of the downstream range group in FIG. 1.
Figure 4:
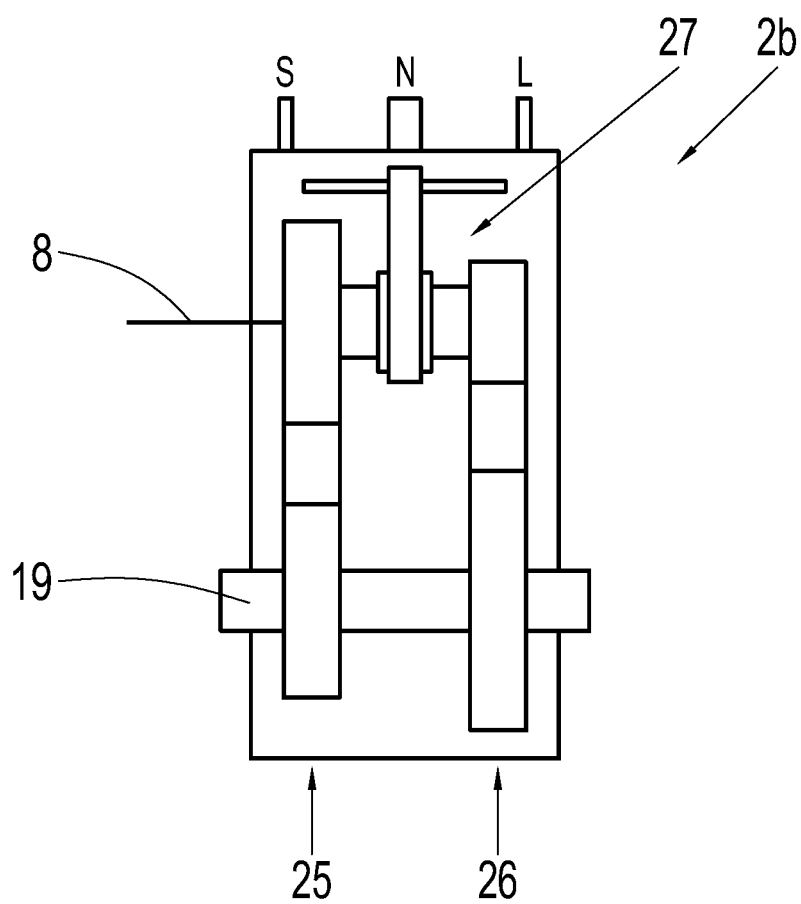
FIG. 4: An alternative configuration of the downstream range group in FIG. 1.

FIG. 4 shows an alternative configuration of the downstream range group 2b, which otherwise than in FIG. 3, is not of planetary design, but rather, in the form of a spur gear structure. Thus, the downstream range group in FIG. 4 has two spur gear stages 25 and 26 and a shifting element 27. Depending on the shift position of the shifting element 27, the output shaft 8 of the main transmission group 2a is coupled to the downstream range group 2b either via the spur gear stage 25 or via the spur gear stage 26.

The invention now relates to a method for shifting the downstream range group 2b of the transmission 2, which in its powershiftable main transmission group 2a comprises frictional shifting elements 9, 10, 11, 12, and 13, in a safe and reliable manner, specifically when the motor vehicle is at rest with its drive aggregate 1 running.

When the motor vehicle is at rest with its drive aggregate 1 running, to shift the downstream range group 2b the parking lock 28 of the main transmission group 2a is first engaged in order to immobilize the output shaft 8 of the main transmission group 2a. Then, the downstream range group 2b is shifted out of a range to be disengaged into neutral. The downstream range group 2b can remain in this neutral position for an arbitrarily long time without any risk that owing to drag losses in the main transmission group 2a the output shaft 8 of the main transmission group 2a will accelerate too much so that thereafter, the range to be engaged in the downstream range group 2b can no longer be engaged reliably.

When the motor vehicle is at rest with its drive aggregate 1 running and with a gear engaged in the main transmission group 2a, in a first variant of the invention, the main transmission group 2a is shifted into neutral before the parking lock 28 is engaged. Only after that, once the main transmission group 2a has been shifted to neutral, is the parking lock 28 of the main transmission 2a engaged and the downstream range group 2b then shifted to neutral. To shift the downstream range group 2b from neutral into a range to be engaged, the parking lock 28 is then disengaged and the downstream range group 2b is then actuated in order to engage the range to be engaged. In that way the range to be engaged can always be engaged reliably in the downstream range group 2b.

As a result of the drag torques in the main transmission group 2a, when the downstream range group 2b is shifted into the range to be engaged, the output shaft 8 of the main transmission group 2a is slightly accelerated, so that even a tooth-on-tooth position sometimes formed at the interlocking shifting element 24, 27 of the downstream range group 2b can be resolved.

When the motor vehicle is stationary with the drive aggregate 1 running and a gear is engaged in the main transmission group 2a, according to a second variant of the invention, it is provided that before and during the engagement of the parking lock 28 in the main transmission group 2a the main transmission group 2a remains in the gear concerned. After engaging the parking lock 28, the downstream range group 2b is then shifted to neutral. For the subsequent shifting of the downstream range group 2b from neutral into a range to be engaged, the main transmission group 2a is then first shifted to neutral and then the parking lock 28 is disengaged and the downstream range group 2b is actuated for engaging the range to be engaged. In this way, too, the range to be engaged in the downstream range group 2b can be engaged safely and reliably, if need be, with automatic resolution of a tooth-on-tooth position at the interlocking shifting element 24, 27 of the downstream range group 2b to be shifted.

The release of the parking lock 28 and the actuation of the downstream range group 2b to engage the range to be engaged preferably take place simultaneously, or alternatively immediately after one another, with a time overlap.

When the motor vehicle is stationary with the drive aggregate 1 running and a gear is engaged in the main transmission group 2a, in accordance with a third alternative of the invention, before and during the engagement of the parking lock 28 in the main transmission group 2a, the main transmission group 2a can remain in the gear concerned. When thereafter the downstream range group 2b is shifted to neutral, then for the subsequent shift of the downstream range group 2b from neutral into the range to be engaged the downstream range group 2b, namely its interlocking shifting element 24 or 27, is actuated in order to engage the said range to be engaged and this is done while the gear in the main transmission group 2a and the parking lock 28 remain engaged.

During this, in accordance with the third alternative of the invention, it is checked whether a tooth-on-tooth position has formed at the interlocking shifting element 24 or 27 to be closed. If it is found that a tooth-on-tooth position has formed at the interlocking shifting element 24 or 27 of the downstream range group 2b, then the main transmission group 2a is first shifted to neutral and then the parking lock 28 is disengaged in order then to resolve the tooth-on-tooth position and shift the downstream range group 2b into the range to be engaged. If there is no tooth-o-tooth position at the interlocking shifting element 24 or 27 of the downstream range group 2b, then after the shifting of the downstream range group 2b, i.e. after it has been changed to the range to be engaged, the parking lock 28 is disengaged and in that case the gear in the main transmission group 2a remains engaged throughout the process.

Accordingly, in the method according to the invention, to shift the downstream range group 2b, before the range to be disengaged in the downstream range group 2b has been disengaged the parking lock 28 in the main transmission group 2a is engaged in order to immobilize the output shaft 8 of the main transmission group 2a. In that case the main transmission group 2a can also previously be shifted to neutral, but alternatively the gear remains engaged in the main transmission group 2a. In each case the output shaft 8 of the main transmission group 2a is prevented from accelerating too much when the downstream range group 2b is in neutral. Thus, the downstream range group can subsequently be shifted reliably from neutral into the range to be engaged.

The invention also relates to a control unit which is designed to carry out the above-described method automatically. The control unit according to the invention is in particular a transmission control unit, preferably an electric or electronic transmission control unit. When the motor vehicle is at rest with the drive aggregate 1 running, in order to shift the downstream range group 2b the control unit actuates the parking lock 28 to engage it in order to immobilize the output shaft 8 of the main transmission group 2a. Thereafter, the control unit actuates an interlocking shifting element 24 or 27 of the downstream range group 2b in order to shift the downstream range group 2b from a range to be disengaged, into neutral.

As already mentioned above, the control unit according to the invention is preferably an electronic control unit which has hardware means and software means for carrying out the method according to the invention. The hardware means include data interfaces for exchanging data with the assemblies involved in carrying out the method according to the invention, for example with the parking lock 28 and the interlocking shifting element 24 or 27 of the downstream range group 2b and the shifting elements of the main transmission group 2a. The hardware means also include a processor for data processing and a memory for data storage. The software means include program modules which are implemented in the control unit according to the invention for carrying out the method according to the invention.

INDEXES

1 Drive aggregate
2 Transmission
2a Main transmission group
2b Downstream range group
3 Gearset
4 Gearset
7 Gearset
6 Gearset
7 Input shaft of the main transmission group
8 Output shaft of the main transmission group
9 Shifting element A
Shifting element B
11 Shifting element C
12 Shifting element D
13 Shifting element E
14 Drive output
15 Converter
16 Turbine
17 Pump
18 Converter bridging clutch
19 Output shaft of the downstream range group
20 Planetary gear system
21 Sun gear
22 Ring gear
23 Web
24 Shifting element
25 Spur gear stage
26 Spur gear stage
27 Shifting element
28 Parking lock

The invention claimed is:

1. A method for operating a motor vehicle having a drive aggregate, with a transmission connected between the drive aggregate and a drive output, and having a hydrodynamic starting element connected between the drive aggregate and the transmission, the method comprising:
providing the transmission comprising:
a powershiftable main transmission group comprising:
a plurality of forward gears,
at least one reversing gear,
a plurality of frictional shifting elements, of which in each gear
a first number of the frictional shifting elements is closed and a second number of the frictional shifting elements is open, and
a parking lock configured such that when the parking lock is engaged an output shaft of the main transmission group is immobilized, and
a downstream range group connected downstream from the main transmission group, the downstream range group comprising at least one interlocking shifting element and which can be shifted between a first range and a second range;
running the drive aggregate when the motor vehicle is stationary;
engaging the parking lock of the main transmission group to enable shifting the downstream range group and to immobilize the output shaft of the main transmission; and
shifting the downstream range group into neutral from a range to be disengaged.

2. The method according to claim 1, comprising:
engaging a gear in the main transmission group;
then, before engaging the parking lock of the main transmission group, shifting the main transmission group to neutral;
disengaging the parking lock;
actuating the downstream range group
shifting the downstream range group from neutral into a range to be engaged.

3. The method according to claim 1, wherein after shifting the downstream range group to neutral, shifting the downstream range group from neutral into a range to be engaged includes:
shifting the main transmission group to neutral;
disengaging the parking lock; and
actuating the downstream range group so as to engage the range to be engaged.

4. The method according to claim 3, wherein disengaging the parking lock takes place simultaneously with actuating the downstream range group in order to engage the range to be engaged.

5. The method according to claim 1, wherein:
when a gear is engaged in the main transmission group, then before and during the engagement of the parking lock the main transmission group remains in the gear; and
when the downstream range group has been shifted into neutral, then in order to shift the downstream range group from neutral into a range to be engaged the downstream range group is actuated in order to engage the range to be engaged while the gear in the main transmission group and the parking lock remain engaged, and during this it is checked whether a tooth-on-tooth position has formed at the interlocking shifting element to be closed in the downstream range group.

6. The method according to claim 5, comprising:
determining whether a tooth-on-tooth position has formed at the interlocking shifting element to be closed in the downstream range group; and
shifting the main transmission group to neutral and then disengaging the parking lock, if it is found that the tooth-on-tooth position has formed.

7. The method according to claim 6, comprising disengaging the parking lock if it is found that a tooth-on-tooth position has not formed at the interlocking shifting element to be closed in the downstream range group, wherein the gear of the main transmission group remains engaged.

8. A control unit of a motor vehicle, the motor vehicle comprising:
a drive aggregate, a transmission connected between the drive aggregate and a drive output and a hydrodynamic starting element connected between the drive aggregate and the transmission;
wherein the hydrodynamic starting element comprises a converter and a converter bridging clutch;
wherein the transmission comprises a powershiftable main transmission group and a downstream range group connected downstream from the main transmission group;

wherein, when a gear is engaged in the main transmission group, the control unit is configured to actuate a first number of frictional shifting elements of the main transmission group to close the shifting elements and configured to a second number of frictional shifting elements to open the shifting elements;

wherein, when the motor vehicle is stationary with its drive aggregate running, then to shift the downstream range group the control unit is configured to actuate a parking lock of the main transmission group in order to immobilize an output shaft of the main transmission group, and configured to actuate an interlocking shifting element of the downstream range group in order to shift the downstream range group from a range to be disengaged into neutral.

9. The control unit according to claim 8, wherein the powershiftable main transmission group further comprises:
a plurality of forward gears,
at least one reversing gear,
a plurality of frictional shifting elements, of which in each gear a first number of the frictional shifting elements is closed and a second number of the frictional shifting elements is open, and
a parking lock configured such that when the parking lock is engaged an output shaft of the main transmission group is immobilized, and the at least one interlocking shifting element can be shifted between a first range and a second range; and the control unit is configured to automatically:
run the drive aggregate when the motor vehicle is stationary;
engage the parking lock of the main transmission group to enable shifting the downstream range group and to immobilize the output shaft of the main transmission; and
shift the downstream range group into neutral from a range to be disengaged.

* * * * *